United States Patent [19]

Ikuma

[11] 4,381,373
[45] Apr. 26, 1983

[54] HEAT RESISTANT RESIN COMPOSITION

[75] Inventor: Sadao Ikuma, Suzuka, Japan

[73] Assignee: Mitsubishi Monsanto Chemical Company, Tokyo, Japan

[21] Appl. No.: 323,078

[22] Filed: Nov. 19, 1981

[30] Foreign Application Priority Data

Dec. 11, 1980 [JP] Japan .................................. 55/175116
Feb. 9, 1981 [JP] Japan .................................. 56/17776

[51] Int. Cl.³ ..................... C08L 25/12; C08L 33/24; C08L 25/08
[52] U.S. Cl. .................................. 525/194; 525/205; 525/207; 525/243; 525/282; 525/285; 525/379; 525/71; 525/73
[58] Field of Search ........................ 525/205, 207, 194

[56] References Cited

U.S. PATENT DOCUMENTS 3,652,726  3/1972  Nield et al. ..................... 260/876
3,801,549  4/1974  Moore et al. ................. 260/784 UA
4,127,617  11/1978  Arrighetti et al. .............. 260/878 R Primary Examiner—Carman J. Seccuro
Attorney, Agent, or Firm—Oblon, Fisher, Spivak, McClelland & Maier

[57] ABSTRACT

A heat resistant resin composition comprises 10 to 90 wt. % of a copolymer (A) having 15 to 50 wt. parts of N-phenylmaleimide component, 85 to 40 wt. parts of a vinyl aromatic monomer component and 0 to 30 wt. parts of a vinyl comonomer component to be 100 wt. parts in total; and 90 to 10 wt. % of a copolymer (B) having 15 to 30 wt. parts of a cyanovinyl monomer component, 85 to 65 wt. parts of a vinyl aromatic monomer component and 0 to 30 wt. parts of a vinyl comonomer component.

7 Claims, No Drawings

HEAT RESISTANT RESIN COMPOSITION

BACKGROUND OF THE INVENTION

1. Field of the Invention

The present invention relates to a heat resistant resin composition having N-phenylmaleimide component and a production thereof.

2. Description of the Prior Art

It has been well known that a copolymer of styrene-maleic anhydride (referring to as SMA resin) has high miscibility to a copolymer of styrene-acrylonitrile (referring to as AS resin) and has high thermal deformation temperature to result in high heat resistance. Therefore, a composition having high heat resistance and high solvent resistance is obtained by blending SMA resin to AS resin. However, the composition has inferior stability at high temperature to cause a foaming, a weight loss and a crosslinkage at higher than 230° C. Thus, it has been difficult to mold the composition by a conventional injection molding process.

In order to improve the stability of SMA resin or the composition thereof at high temperature, it has been studied to incorporate a conventional antioxidant such as a phenol type, amine type or phosphorus type antioxidant into the SMA resin or the composition thereof, however a desired effect has not been found.

SUMMARY OF THE INVENTION

It is an object of the present invention to overcome the problem of SMA resin or a composition of SMA-AS resin.

It is an object of the present invention to provide a heat resistant resin composition having excellent stability at high temperature.

The foregoing and other objects of the present invention have been attained by providing a heat resistant resin composition which comprises 10 to 90 wt. % of a copolymer (A) having 15 to 50 wt.parts of N-phenylmaleimide component, 85 to 40 wt.parts of a vinyl aromatic monomer component and 0 to 30 wt.parts of a vinyl comonomer component to be 100 wt.parts in total; and 90 to 10 wt. % of a copolymer (B) having 15 to 30 wt.parts of a cyanovinyl monomer component, 85 to 65 wt.parts of a vinyl aromatic monomer component and 0 to 30 wt.parts of a vinyl comonomer component.

DETAILED DESCRIPTION OF THE PREFERRED EMBODIMENTS

The present invention has been attained by an imidation of maleic anhydride component of SMA resin.

The typical vinyl aromatic monomer used for producing the copolymer (A) is styrene and also can be a styrene derivative such as α-methylstyrene, t-butylstyrene, o-chlorostyrene or p-chlorostyrene.

The typical cyanovinyl monomer are acrylonitrile and methacrylonitrile.

The typical vinyl comonomers used in the production of the copolymer (A) can be vinyl monomers having polar group for example, maleic anhydride; and acrylic acid ester and methacrylic acid ester such as methyl acrylate and methyl methacrylate.

The copolymer (A) preferably has the following components: 15 to 50 wt.parts of N-phenylmaleimide component (the component means units of a monomer in the polymer); 85 to 0 wt.parts of a vinyl aromatic monomer component; 40 to 30 wt.parts of a vinyl comonomer component (the free maleic anhydride component is preferably 20 wt.parts or less as described below) to be 100 wt.parts in total.

In the production of the copolymer (A), it is possible to copolymerize N-phenylmaleimide monomer with the other monomers. However, it is preferable to react maleic anhydride (at a desired ratio) with the other monomer and to react the resulting copolymer with aniline so as to perform an imidation of the maleic anhydride component in view of easy availability of the monomer and economy.

A ratio of N-phenylmaleimide component in the copolymer (A) is preferably in a range of 15 to 50 wt.parts per 100 wt.parts of the copolymer (A). When it is less than 15 wt.parts, the stability at high temperature and the improvement of heat resistance are not high enough, whereas when it is more than 50 wt.parts, the fluidity in the mold-processing is not high enough.

When the copolymer (A) is produced by reacting aniline with a copolymer having maleic anhydride component, the stability at high temperature is inferior if the content of the free maleic anhydride component is too much. Therefore, the content of the free maleic anhydride component is preferably 20 wt.parts or less especially 15 wt.parts or less per 100 wt.parts of the copolymer (A).

The contents of the vinyl aromatic monomer component and the vinyl comonomer component are preferably in said ranges. When the content is more than the upper limit, the heat resistance of the copolymer (A) is not high enough whereas when the content is less than the lower limit, the miscibility to the other resin is inferior.

The cyanovinyl monomer and the vinyl aromatic monomer used in the production of the copolymer (B) can be the same as the monomers illustrated in the production of the copolymer (A).

The vinyl comonomer is preferably an acrylic acid ester and methacrylic acid ester such as methyl acrylate and methyl methacrylate.

The copolymer (B) preferably has the following components: 15 to 30 wt.parts of a cyanovinyl monomer component, 85 to 65 wt.parts of a vinyl aromatic monomer component and 0 to 30 wt.parts of a vinyl comonomer to be 100 wt.parts in total. In the ranges, the miscibility to the copolymer (A) is excellent and the resulting composition is transparent. It is not preferable to be out of the ranges, because the miscibility to the copolymer (A) is inferior and the physical properties of the blend composition of the copolymers (A) and (B) are inferior.

A ratio of the copolymer (A) to the copolymer (B) is selected from the ranges of 10 to 90 wt. % of the copolymer (A) and 90 to 10 wt. % of the copolymer (B) depending upon desired physical properties such as moldability and heat resistance. When the content of the copolymer (A) is less than 10 wt. %, the heat resistance is not high enough whereas when it is more than 90 wt. %, the solvent resistance and the fluidity in the molding and processing are disadvantageously inferior.

The copolymers (A) and (B) can be blended after separate polymerizations, however, as shown in the examples and references, it is preferable to produce the copolymers (A) and (B) by the sequence polymerizations since the blending step can be eliminated. In the operation, the imidation of maleic anhydride component can be simultaneously performed in the step of the polymerization for producing the copolymer (B).

The composition of the present invention has excellent heat resistance and stability at high temperature and excellent fluidity in the molding and processing and has good miscibility to the other resins and can blend to ABS resin or AS resin so as to improve an impact strength. It is also possible to incorporate a reinforcing material and a filler such as glass fiber, carbon fiber, talc, calciumcarbonate and the other additive in the composition.

It is possible to produce the composition by a bulk-suspension polymerization comprising a step of a bulk copolymerization of maleic anhydride and a vinyl aromatic monomer and a step of a suspension copolymerization of the resulting syrup mixture and a cyanovinyl monomer suspended in an aqueous solution together with an imidation of maleic anhydride component of the copolymer with an aromatic amine.

The aromatic amine is preferably aniline because of easy availability and can be haloanilines, nitroanilines, toluidine, α-naphthylamine, phenylenediamine or mixtures thereof.

The N-aromatic maleimide component is formed by the reaction of maleic anhydride with the aromatic amine in the polymerization system as described below.

In the bulk copolymerization of maleic anhydride and vinyl aromatic monomer, a vinyl aromatic monomer such as styrene is kept in the polymerization system and a mixture of a vinyl aromatic monomer and maleic anhydride is continuously fed to perform the copolymerization. It is preferable to feed 70 to 170 wt.parts of the mixture of maleic anhydride and the vinyl aromatic monomer at 20 to 35 wt. % of a concentration of maleic anhydride into 100 wt.parts of the vinyl aromatic monomer kept in the polymerization system. The feed ratio is depending upon a desired content of maleic anhydride component. A solubility of maleic anhydride to the vinyl aromatic monomer is not so high. Therefore, it is not preferable to give a high concentration of maleic anhydride. When the concentration of maleic anhydride is 35 wt. % or higher, maleic acid is crystallized if the mixture is not stored at 40° C. or higher. Moreover, if the mixture is stored at high temperature, the thermal polymerization of maleic anhydride and a vinyl aromatic monomer is resulted to cause clogging of a pipe. In order to prevent the thermal polymerization, it is effective to incorporate a polymerization inhibitor such as t-butyl catechol at a concentration of about 250 ppm.

The polymerization is preferably performed by a thermal polymerization. The polymerization is performed by heating the mixture in the polymerization system at 100° to 130° C. without using a polymerization initiator. When the feeding of the mixture of maleic anhydride is finished, the maleic anhydride in the mixture is rapidly consumed to produce a syrup mixture of the copolymer of maleic anhydride and the vinyl aromatic monomer component dissolved in the unreacted vinyl aromatic monomer.

In the bulk copolymerization, it is also possible to charge a mixture of the vinyl aromatic monomer and maleic anhydride at a concentration of maleic anhydride of 5 wt. % or less preferably 1 to 3 wt. % and then to continuously feed maleic anhydride. In the latter process, there is no trouble of the crystallization of maleic anhydride and the clogging of a pipe caused by the thermal polymerization. Therefore, the latter process is suitable for the production of the copolymer having high content of maleic anhydride component.

The concentration of maleic anhydride in the mixture kept in the polymerization system at the initiation highly affects to the polymerization velocity and is usually 5 wt. % or less, preferably 1 to 3 wt. %.

In the bulk copolymerization, it is preferable to continuously feed 10 to 25 wt.parts of maleic anhydride per 100 wt.parts of the mixture of maleic anhydride and the vinyl aromatic monomer in the polymerization system.

The amount of maleic anhydride is depending upon the desired content of maleic anhydride component in the copolymer, and is usually in a range of 20 to 35 wt. %. Thus, said amount of maleic anhydride is suitable. It is preferable to perform a thermal polymerization by heating them at 100° to 130° C.

The feeding rate of maleic anhydride is preferably high during the initiation of the polymerization at a lower viscosity and is reduced depending upon the increase of the viscosity in the polymerization, whereby the heat can be easily removed and the polymerization time can be reduced.

It is possible to replace a part of the vinyl aromatic monomer kept in the polymerization system at the initiation to a vinyl comonomer which is copolymerizable with maleic anhydride and the vinyl aromatic monomer, for example, alkyl acrylate; methacrylic acid ester such as methyl methacrylate; acrylonitrile and methacrylonitrile, in the bulk copolymerization.

The product obtained in the bulk copolymerization is a syrup mixture containing 35 to 60 wt. % of the unreacted vinyl aromatic monomer and a residural content of a copolymer of the vinyl aromatic monomer and maleic anhydride at 20 to 35 wt. % of a content of maleic anhydride component. Then, the resulting syrup mixture is admixed with the cyanovinyl monomer and the aromatic amine and the mixture is heated while stirring at 70° to 130° C. for 5 to 60 minutes.

The amount of the cyanovinyl monomer is preferably in a range of 10 to 25 wt.parts per 100 wt.parts of the total of the vinyl aromatic monomer charged in the polymerization system in the bulk copolymerization. The molar ratio of the aromatic amine to the total of maleic anhydride charged in the bulk copolymerization is preferably in a range of 0.8 to 1.5.

When the aromatic amine especially aniline is incorporated, the reaction of the maleic anhydride in the copolymer is performed to form monoamide component. The aromatic amine can be added after suspending the syrup mixture in water, if desired.

The syrup mixture of the polymer is suspended in an aqueous solution. It is preferable to use a convention suspending agent for example, polyvinyl alcohol, polyacrylamide and barium sulfate.

The polymerization initiator can be the conventional initiator such as azobisisobutyronitrile and benzoyl peroxide. The polymerization is carried out at 60° to 120° C. for 1 to 5 hours and then, it is heated to higher temperature of 120° to 190° C. to perform the N-aromatic maleimidation. The degree of the imidation is higher depending upon the rise of the temperature. In the imidation, the degree of the imidation can be increased at relatively low temperature when an alkaline compound such as triethylamine is used as a catalyst as disclosed in Japanese Examined Patent Publication No. 24024/1972.

The degree of the imidation is higher depending upon an increase in an amount of the aromatic amine. However, the aforementioned range is suitable in view of a trouble of a treatment of excess amine after the reaction.

In accordance with the present invention, 60% or more of maleic anhydride component in the copolymer is imidized.

The copolymer obtained by the process of the present invention has excellent heat resistance. Even though the copolymer is heated at 270° C. for 1 hour, any foaming is not found and weight loss and discoloring are quite small as those of ABS resin.

The present invention will be further illustrated by certain examples and references which are provided for purposes of illustration only and are not intended to be limiting the present invention.

REFERENCE 1

Into a 2 liter autoclave, 300 g. of styrene was charged and heating while stirring during purging with nitrogen gas. A monomer mixture of 300 g. of styrene and 100 g. of maleic anhydride was continuously fed at a constant rate during 4 hours to perform a bulk polymerization at 118° C. After the completion of the continuous charging, the reaction mixture was a syrup containing 400 g. of SMA having 25 wt. % of a maleic anhydride component and 300 g. of styrene. In the mixture, 105 g. of acrylonitrile and 0.3 g. of t-dodecyl mercaptan (TDM) were added while stirring. Then, 720 g. of water and 20 g. of a suspending agent (2% aqueous solution of PVA copolymer) were added to the mixture to suspend the syrup mixture in water and then, 0.4 g. of azobisisobutyronitrile (AIBN) was added to the suspension to polymerize it at 80° C. for 2 hours and then at 120° C. for 3 hours.

The resulting bead polymer was pelletized by an extruder equipped with bent. According to an analysis, the pellet was a mixture of 52 wt.parts of SMA having 25 wt. % of a maleic anhydride component and 48 wt.parts of AS resin having 25 wt. % of an acrylonitrile component. Test specimens were prepared from the pellets by an injection extruder and various physical characteristics were measured by the below-mentioned process. The results are shown in Table 1.

EXAMPLE 1

In accordance with the process of Reference 1, except adding 105 g. of aniline and 3 g. of triethylamine after the transferring of the syrup into the suspends before the addition of AIBN, the reaction was carried out.

The resulting pellet was substantially the same composition as that of Reference 1 except that 70 mole % of maleic anhydride component was N-phenylmaleimidized.

As it is found in Table 1, the product of Example 1 had high heat resistance and high tensile strength substantially the same as those of the composition of Reference 1 and excellent high temperature stability which was remarkably improved from that of Reference 1 and which was substantially the same with that of AS resin (Reference 6).

REFERENCE 2

Into a 2 liter autoclave, 270 g. of styrene was charged and heated while stirring during purging with nitrogen gas. A monomer mixture of 300 g. of styrene and 130 g. of maleic anhydride was continuously fed at a constant rate during 3 hours 40 minutes to perform a bulk polymerization at 120° C. After the completion of the continuous charging, the reaction mixture was a syrup containing 430 g. of SMA having 30 wt. % of maleic anhydride component and 270 g. of styrene.

The reaction mixture was further treated by the process set forth in Reference 1.

The resulting pellet was a mixture of 59 wt.parts of SMA having 30 wt. % of maleic anhydride component and 41 wt.parts of AS resin having 26 wt. % of acrylonitrile component. The physical properties of the product are shown in Table 1.

EXAMPLE 2

In accordance with the process of Reference 2 except adding 135 g. of aniline and 4 g. of triethylamine after transferring the syrup into the suspension before the addition of AIBN, the polymerizations were carried out.

The resulting pellet had substantially the same composition as that of Reference 2 except that 72 mole % of maleic anhydride of SMA was N-phenylmaleimidized. The physical properties of the product are shown in Table 1. The product had excellent high temperature stability which was remarkably improved from that of Reference 2 and which was substantially the same as that of AS resin (Reference 6).

REFERENCE 3

Into a 2 liter autoclave, 250 g. of styrene and 20 g. of methyl methacrylate were charged and heated while stirring during puring with nitrogen gas. A monomer mixture of 280 g. of styrene, 20 g. of methyl methacrylate and 130 g. of maleic anhydride was continuously fed at a constant rate during 3 hours and 20 minutes to perform a bulk polymerization at 120° C. After the completion of the continuous charging, the reaction mixture was a syrup containing 430 g. of a copolymer of styrene maleic anhydride-methyl methacrylate having 30 wt. % of maleic anhydride component and 5 wt. % of methyl methacrylate, 250 g. of styrene and 20 g. of methyl methacrylate.

The reaction mixture was further treated by the process set forth in Reference 1.

The resulting pellet was a mixture of 60 wt.parts of a copolymer of styrene-maleic anhydride-methyl methacrylate having 30 wt. % of maleic anhydride component and 5 wt. % of methyl methacrylate and 40 wt.parts of a copolymer of styrene-acrylonitrile-methyl methacrylate having 26 wt. % of acrylonitrile component and 5 wt. % of methyl methacrylate. The physical properties of the product are shown in Table 1.

EXAMPLE 3

In accordance with the process of Reference 3 except adding 135 g. of aniline and 4 g. of triethylamine after transferring the syrup into the suspension before the addition of AIBN, the polymerizations were carried out.

The resulting pellet had substantially the same composition as that of Reference 3 except that 73 mole % of maleic anhydride component of the copolymer of styrene-maleic anhydride-methyl methacrylate was N-phenylmaleimidized.

As it is found in Table 1, the product had excellent high temperature stability which was remarkably improved from that of Reference 3 and which was substantially the same with that of AS resin (Reference 6).

REFERENCE 4

A mixture of 60 wt.parts of the pellets of Reference 2 and 40 wt.parts of ABS resin (49 wt.% of styrene component, 18 wt. % of acrylonitrile component and 33 wt. % of butadiene component) obtained by an emulsion polymerization was pelletized by an extruder equipped with a bent. Test specimens were prepared from the pellets by an injection extruder and the physical properties of the product were measured. The results are shown in Table 1.

The physical properties of the products were measured by the following methods:

Tensile strength and Izod impact strength: Japanese Industrial Standard K-6871

Heat resistance: (Vicat softening point) Japanese Industrial Standard K-6870

High temperature stability (Gear's oven test):

A test specimen is heated in a Gear's oven for 1 hour at a specific temperature and a foaming of the specimen and a weight loss are measured.

TABLE 1

| | N—phenyl maleimidation of maleic anhydride (mole %) | Tensile strength (kg/cm$^2$) | Izod impact strength (kg.cm/cm) | Vicat softening point (°C.) | Gear's oven test Foaming initiation temp. (°C.) | Weight loss at 270° C. (wt. %) |
|---|---|---|---|---|---|---|
| Ref. 1 | 0 | 640 | 1.3 | 125 | 230 | 3.2 |
| Exp. 1 | 70 | 650 | 1.2 | 126 | >280 | 0.9 |
| Ref. 2 | 0 | 640 | 1.1 | 134 | 230 | 3.7 |
| Exp. 2 | 72 | 650 | 1.1 | 136 | >280 | 0.9 |
| Ref. 3 | 0 | 620 | 1.1 | 134 | 230 | 3.7 |
| Exp. 3 | 73 | 630 | 1.2 | 135 | >280 | 0.9 |
| Ref. 4 | 0 | 460 | 12.5 | 120 | 230 | 3.4 |
| Exp. 4 | 72 | 460 | 12.0 | 122 | >280 | 1.0 |
| Ref. 5 | 40 | 630 | 1.2 | 135 | 250 | 1.6 |
| Ref. 6 | — | 720 | 1.8 | 100 | >280 | 0.9 |
| Ref. 7 | — | 470 | 16.0 | 98 | >280 | 1.0 |

EXAMPLE 4

In accordance with the process of Reference 4 except using the pellets of Example 2, the sample was prepared and the physical properties were measured.

As it is found in Table 1, the impact strength was remarkably improved by the incorporation of ABS resin in Reference 4 and Example 4. The product of Example 4 had excellent high temperature stability which was remarkably improved from that of Reference 4 and which was substantially the same as that of ABS resin (Reference 7) because of the N-phenylmaleimidation of the most portion of maleic anhydride component of the polymer.

REFERENCE 5

In accordance with the process of Example 2 except adding 100 g. of aniline instead of 135 g. of aniline and 4 g. of triethylamine, the polymerizations were carried out.

The resulting pellet had substantially the same composition as that of Example 2 except 40 mole % of maleic anhydride component of SMA was N-phenylmaleimidized.

As it is found in Table 1, the product of Reference 5 had a high temperature stability better than that of Reference 2 but lower than that of AS resin (Reference 6).

REFERENCE 6

The physical properties of AS resin commercially available from Mitsubishi Monsanto Chem. (SAN-C) were measured and shown in Table 1.

REFERENCE 7

A mixture of 60 wt.parts of AS resin of Reference 6 and 40 wt.parts of ABS resin of Reference 4 was pelletized by an extruder equipped with a bent. Test specimens were prepared from the pellets by an injection extruder. The physical properties of the product are shown in Table 1.

EXAMPLE 5

Into a 2 liter autoclave, 296 g. of styrene was charged and heated at 100° C. while stirring under purging with nitrogrogen gas. A monomer mixture of 280 g. of styrene and 120 g. of maleic anhydride was continuously fed to the autoclave at a constant rate of 1.48 g/min. After the initiation of the continuous feeding, the temperature of the mixture was raised from 100° C. to 115° C. during 15 minutes and was kept at 115° C. for 255 minutes during the feeding to perform a bulk polymerization. At the completion of the continuous feeding, a conversion was 54 wt. % and the resulting polymer in the syrup had 30 wt. % of maleic anhydride component.

In the reaction mixture, 104 g. of acrylonitrile was added while stirring to fall the temperature to 95° C. and then, a mixture of 108 g. of aniline and 24 g. of triethylamine was added and the mixture was stirred at 95° C. for 10 minutes.

Into the mixture, a solution of 0.3 g. of a polyvinyl alcohol suspending agent, 0.3 g. of polyacrylic acid ester suspending agent and 3 g. of sodium sulfate in 650 g. of water was charged to suspend the syrup mixture and then, 0.4 g. of azobisisobutyronitrile (AIBN) was added and the mixture was heated at 80° C. for 90 minutes and then heated to 155° C. during 60 minutes and kept at 155° C. for 120 minutes to perform a suspension polymerization and an imidation, and then the reaction mixture was cooled. The resulting polymer in the bead form was separated from the solution by a filter cloth and was dried. A yield was 840 g.

The bead polymer was pelletized by an extruder (1 inch diameter) equipped with a bent. According to an analysis, the pellet was a mixture of 56 wt.parts of a copolymer of styrene-maleic anhydride (87% of maleic anhydride component is N-phenylmaleimidized) having 30 wt. % of maleic anhydride component and 44 wt.parts of a copolymer of styrene-acrylonitrile having 25 wt. % of acrylonitrile component.

Test specimens were prepared from the pellets by an injection extruder (1 ounce) and various physical properties were measured. The results are shown in Table 2.

EXAMPLE 6

In accordance with the process of Example 5, a copolymerization of styrene and maleic anhydride was carried out and then 104 g. of acrylonitrile was added to the resulting syrup mixture and the mixture was stirred at 95° C. for 10 minutes and then, a solution of 0.3 g. of a polyvinyl alcohol suspending agent, 0.3 g. of polyacrylic acid ester suspending agent and 3 g. of sodium sulfate in 650 g. of water was charged to suspend the syrup mixture and then, 108 g. aniline and 24 g. of triethylamine were added and 0.4 g. of AIBN was added and the mixture was heated at 80° C. for 90 minutes and then, heated to 155° C. during 60 minutes and kept at 155° C. for 120 minutes to perform a suspension polymerization and an imidation and then, the reaction mixture was cooled to obtain 850 g. of a polymer in the bead form.

The bead polymer was pelletized by the process of Example 1. The pellet was a mixture of 55 wt.parts of a copolymer of styrene-maleic anhydride (86% of maleic anhydride component is N-phenylmaleimidized) having 30 wt. % of maleic anhydride component and 45 wt.parts of a copolymer of styrene-acrylonitrile having 25 wt. % of acrylonitrile component. The physical properties are shown in Table 2.

EXAMPLE 7

In accordance with the process of Example 6, a syrup mixture containing 104 g. of acrylonitrile was prepared. A solution of 0.3 g. of polyvinyl alcohol suspending agent, 0.3 g. of a polyacrylic acid ester suspending agent and 3 g. of sodium sulfate in 650 g. of water was charged to suspend the syrup mixture and 0.4 g. of AIBN was added and the mixture was heated at 80° C. for 90 minutes and then heated to 155° C. during 60 minutes to perform a suspension polymerization and a mixture of 108 g. of aniline and 24 g. of triethylamine was added and the mixture was heated at 155° C. for 120 minutes to perform a suspenion polymerization and an imidation and then, the reaction mixture was cooled to room temperature to obtain 850 g. of a bead polymer. The polymer had the formulation substantially the same as that of Example 6. The physical properties were measured by test specimens prepared as Example 5. The results are shown in Table 2.

EXAMPLE 8

A mixture of 64 wt.parts of the pellets of Example 7 and 36 wt.parts of ABS resin (49 wt. % of styrene component, 17 wt. % of acrylonitrile component and 34 wt. % of butadiene) obtained by an emulsion polymerization was pelletized by an extruder equipped with a bent. Test specimens were prepared from the pellets by an injection extruder and various physical properties were measured. The results are shown in Table 2.

REFERENCE 8

In accordance with the process of Example 6, the syrup mixture containing 104 g. of acrylonitrile was obtained. A solution of 0.3 g. of a polyvinyl alcohol suspending agent, 0.3 g. of a polyacrylic acid ester suspending agent and 3 g. of sodium sulfate in 650 g. of water was charged to suspend the syrup mixture and 0.4 g. of AIBN was added and the mixture was heated at 80° C. for 90° C. and then heated to 155° C. during 60 minutes to perform a suspension polymerization at 155° C. for 120 minutes and the reaction mixture was cooled to room temperature to obtain 750 g. of a polymer in a bead form.

In accordance with the process of Example 5, the polymer was pelletized. The pellet was a mixture of 52 wt.parts of a copolymer of styrene-maleic anhydride having 30 wt. % of maleic anhydride component and 48 wt.parts of a copolymer of styrene-acrylonitrile having 25 wt. % of acrylonitrile component. The physical properties are shown in Table 2.

REFERENCE 9

The physical properties of AS resin commercially available from Mitsubishi Monsanto Chem. (SAN-C) were measured and shown in Table 2.

REFERENCE 10

A mixture of 64 wt.parts of AS resin of Reference 9 and 36 wt.parts of ABS resin of Example 8 was pelletized by an extruder equipped with a bent. Test specimens were prepared from the pellets by an injection extruder. The physical properties of the product are shown in Table 2.

TABLE 2

| | Tensile strength (kg/cm$^2$) | Izod impact strength (kg.cm/cm) | Vicat softening point (°C.) | Gear's oven test at 270° C. Foaming | Weight loss (wt. %) |
| --- | --- | --- | --- | --- | --- |
| Exp. 5 | 680 | 1.1 | 131 | none | 0.9 |
| Exp. 6 | 670 | 1.2 | 130 | none | 0.9 |
| Exp. 7 | 670 | 1.1 | 130 | none | 0.9 |
| Exp. 8 | 490 | 13.0 | 122 | none | 1.0 |
| Ref. 8 | 660 | 1.3 | 129 | foaming | 3.6 |
| Ref. 9 | 720 | 1.8 | 100 | none | 0.9 |
| Ref. 10 | 470 | 15.0 | 98 | none | 1.0 |

EXAMPLE 9

Into a 2 liter autoclave, 576 g. of styrene and 15.4 g. of maleic anhydride were charged and heated at 115° C. while stirring under purging with nitrogen. In the mixture, 104.6 g. of maleic anhydride at 60° C. was continuously fed at each feeding rate shown in Table 3 to perform a bulk polymerization at 115° C. for 186 minutes.

At the completion of the continuous feeding, a conversion was 54 wt. % and a maleic anhydride component of the polymer in the syrup mixture was 30 wt. %.

TABLE 3

| Time (min.) | Feeding rate (g./min.) | Sum of maleic anhydride (g) |
| --- | --- | --- |
| 0 | 0.75 | 0 |
| 30 | 0.68 | 21.4 |
| 60 | 0.62 | 40.8 |
| 90 | 0.56 | 58.5 |
| 120 | 0.51 | 74.4 |
| 150 | 0.46 | 89.0 |
| 186 | 0.41 | 104.6 |

In the mixture, 104 g. of acrylonitrile was charged while stirring to fall the temperature to 95° C. and then a mixture of 108 g. of aniline and 24 g. of triethylamine was added and the mixture was stirred at 95° C. for 10 minutes. A solution of 0.3 g. of a polyvinyl alcohol suspending agent, 0.3 g. of a polyacrylic acid ester suspending agent and 3 g. of sodium sulfate in 650 g. of water was charged to suspend the syrup mixture containing acrylonitrile and aniline and 0.4 g. of AIBN was added. The mixture was heated at 80° C. for 90 minutes and then heated to 155° C. during 120 minutes and kept at 155° C. for 120 minutes to perform a suspension polymerization and an imidation and then the reaction mixture was cooled to room temperature.

The resulting bead polymer was separated from the solution by a filter cloth and was dried. A yield of the polymer was 840 g.

The bead polymer was pelletized by an extruder (1 inch diameter) equipped with a bent.

According to the analysis, the pellet was a mixture of 56 wt.parts of a copolymer of styrene-maleic anhydride (87% of maleic anhydride was N-phenylmaleimidized) having 30 wt. % of maleic anhydride component and 44 wt.parts of a copolymer of styrene-acrylonitrile having 25 wt. % of acrylonitrile component. Test specimens were prepared from the pellets by an injection extruder (1 ounce) and various physical properties were measured. The results are shown in Table 4.

EXAMPLE 10

In accordance with the process of Example 9, a syrup mixture containing a copolymer of styrene-maleic anhydride was prepared and 104 g. of acrylonitrile was added to the syrup mixture and the mixture was heated at 95° C. and stirred for 10 minutes.

A solution of 0.3 g. of a polyvinyl alcohol suspending agent, 0.3 g. of a polyacrylic acid ester suspending agent and 3 g. of sodium sulfate in 650 g. of water was charged to suspend the syrup mixture and a mixture of 108 g. of aniline and 24 g. of triethylamine was and then 0.4 g. of AIBN was added. The mixture was heated at 80° C. for 90 minutes and then heated to 155° C. during 60 minutes and kept at 155° C. for 120 minutes to perform a suspension polymerization and an imidation and the reaction mixture was cooled to room temperature.

In accordance with the process of Example 9, a polymer in a bead form was produced. A yield was 850 g.

In accordance with the rocess of Example 9, the polymer was pelletized. The pellet was a mixture of 55 wt.parts of a copolymer of styrene-maleic anhydride (86% of maleic anhydride was N-phenylmaleimidized) having 30 wt. % of maleic anhydride component and 45 wt.parts of a copolymer of styrene-acrylonitrile having 25 wt. % of acrylonitrile component. The physical properties of the polymer are shown in Table 4.

EXAMPLE 11

In accordance with the process of Example 10, a syrup mixture of a copolymer of styrene-maleic anhydride containing 104 g. of acrylonitrile was prepared. A solution of 0.3 g. of a polyvinyl alcohol suspending agent, 0.3 g. of a polyacrylic acid ester suspending agent and 3 g. of sodium sulfate in 650 g. of water was charged to suspend the syrup mixture and 0.4 g. of AIBN was added. The mixture was heated at 80° C. for 90 minutes and then heated to 155° C. during 60 minutes to perform a suspension polymerization. In the reaction mixture, 108 g. of aniline and 24 g. of triethylamine was added and the mixture was heated at 155° C. for 120 minutes to perform a suspension polymerization and an imidation and the reaction mixture was cooled to room temperature.

In accordance with the process of Example 9, a polymer in a bead form was produced. A yield was 850 g.

In accordance with the process of Example 9, the polymer was pelletized. The pellet had a formulation substantially the same as that of Example 10. The physical properties of the polymer are shown in Table 4.

EXAMPLE 12

A mixture of 64 wt.parts of the pellets of Example 11 and 36 wt.parts of ABS resin (49 wt. % of styrene component, 17 wt. % of acrylonitrile component; 34 wt. % of butadiene component) obtained by an emulsion polymerization was pelletized by an extruder equipped with a bent. Test specimens were prepared from the pellets by an injection extruder and various physical properties were measured. The results are shown in Table 4.

REFERENCE 11

In accordance with the process of Example 6, the syrup mixture containing 104 g. of acrylonitrile was prepared. A solution of 0.3 g. of a polyvinyl alcohol, 0.3 g. of a polyacrylic acid ester suspending agent and 3 g. of sodium sulfate in 650 g. of water was charged to suspend the syrup mixture and 0.4 of AIBN was added. The mixture was heated at 80° C. for 90 minutes and then heated to 155° C. during 60 minutes and kept at 155° C. for 120 minutes to perform a suspension polymerization and the reaction mixture was cooled to room temperature.

In accordance with the process of Example 9, a polymer in a bead form was produced. A yield was 750 g.

In accordance with the process of Example 9, the polymer was pelletized. The pellet was a mixture of 52 wt.parts of a copolymer of styrene-maleic anhydride having 30 wt.% of maleic anhydride and 48 wt.parts of a copolymer of styrene-acrylonitrile having 25 wt. % of acrylonitrile component. The physical properties are shown in Table 4.

TABLE 4

| | Tensile strength (kg/cm$^2$) | Izod impact strength (kg.cm/cm) | Vicat softening point (°C.) | Gear's oven test at 270° C. | |
|---|---|---|---|---|---|
| | | | | Foaming | Weight loss (wt. %) |
| Exp. 9 | 680 | 1.2 | 131 | none | 0.9 |
| Exp. 10 | 670 | 1.2 | 130 | none | 0.9 |
| Exp. 11 | 670 | 1.2 | 131 | none | 0.9 |
| Exp. 12 | 490 | 13.0 | 123 | none | 1.0 |
| Ref. 11 | 660 | 1.3 | 129 | foaming | 3.6 |

I claim:

1. A heat resistant resin composition which consists essentially of 10 to 90 wt. % of a copolymer (A) having 15 to 50 wt.parts of N-phenylmaleimide component, 85 to 40 wt.parts of a vinyl aromatic monomer component and 0 to 30 wt.parts of a vinyl comonomer component to be 100 wt.parts in total, which is obtained by imidization of vinyl aromatic/maleic anhydride copolymer with an aromatic amine; and 90 to 10 wt. % of a copolymer (B) having 15 to 30 wt.parts of a cyanovinyl monomer component, 85 to 65 wt.parts of a vinyl aromatic monomer component and 0 to 30 wt.parts of vinyl comonomer component.

2. The heat resistant resin composition according to claim 1 wherein said vinyl aromatic monomer component is styrene component.

3. The heat resistant resin composition according to claim 1 wherein said cyanovinyl monomer component is acrylonitrile component.

4. In a process for producing a heat resistant composition of claim 1 by copolymerizing maleic anhydride, a vinyl aromatic monomer and a cyanovinyl monomer an improvement characterized in that maleic anhydride component of a copolymer is imidized with an aromatic amine in a step of copolymerization.

5. The process according to claim 4 which comprises a step of a bulk polymerization of maleic anhydride and a vinyl aromatic monomer and a step of a suspension copolymerization of the resulting syrup mixture and a cyanovinyl monomer suspended in an aqueous solution together with an imidation of maleic anhydride component of the copolymer with an aromatic amine.

6. The process according to claim 5 wherein a vinyl aromatic monomer is incorporated in a polymerization system and a mixture of a vinyl aromatic monomer and maleic anhydride is continuously fed to the step of the bulk copolymerization of maleic anhydride and a vinyl aromatic monomer.

7. The process according to claim 5 wherein a vinyl aromatic monomer containing 5 wt. % or less of maleic anhydride is incorporated in a polymerization system and maleic anhydride is continuously fed in the step of the bulk copolymerization of maleic anhydride and a vinyl aromatic monomer.

* * * * *

UNITED STATES PATENT AND TRADEMARK OFFICE

Certificate

Patent No. 4,381,373                                           Patented April 26, 1983

Sadao Ikuma

Application having been made by Sadao Ikuma, the inventor named in the patent above identified, and Mitsubishi Monsanto Chemical Co., the assignee, for the issuance of a certificate under the provisions of Title 35, Section 256, of the United States Code, adding the names of Yuji Aoki and Noboru Watanabe as joint inventors, and a showing and proof of facts satisfying the requirements of the said section having been submitted, it is this 4th day of Dec., 1984, certified that the names of said Yuji Aoki and Noboru Watanabe are hereby added to the said patent as joint inventors with the said Sadao Ikuma.

Fred W. Sherling,
*Associate Solicitor.*